May 10, 1938.  J. C. KARNES  2,116,519
INDEPENDENT ELEVATION INDICATOR FOR GUNS
Filed March 20, 1935
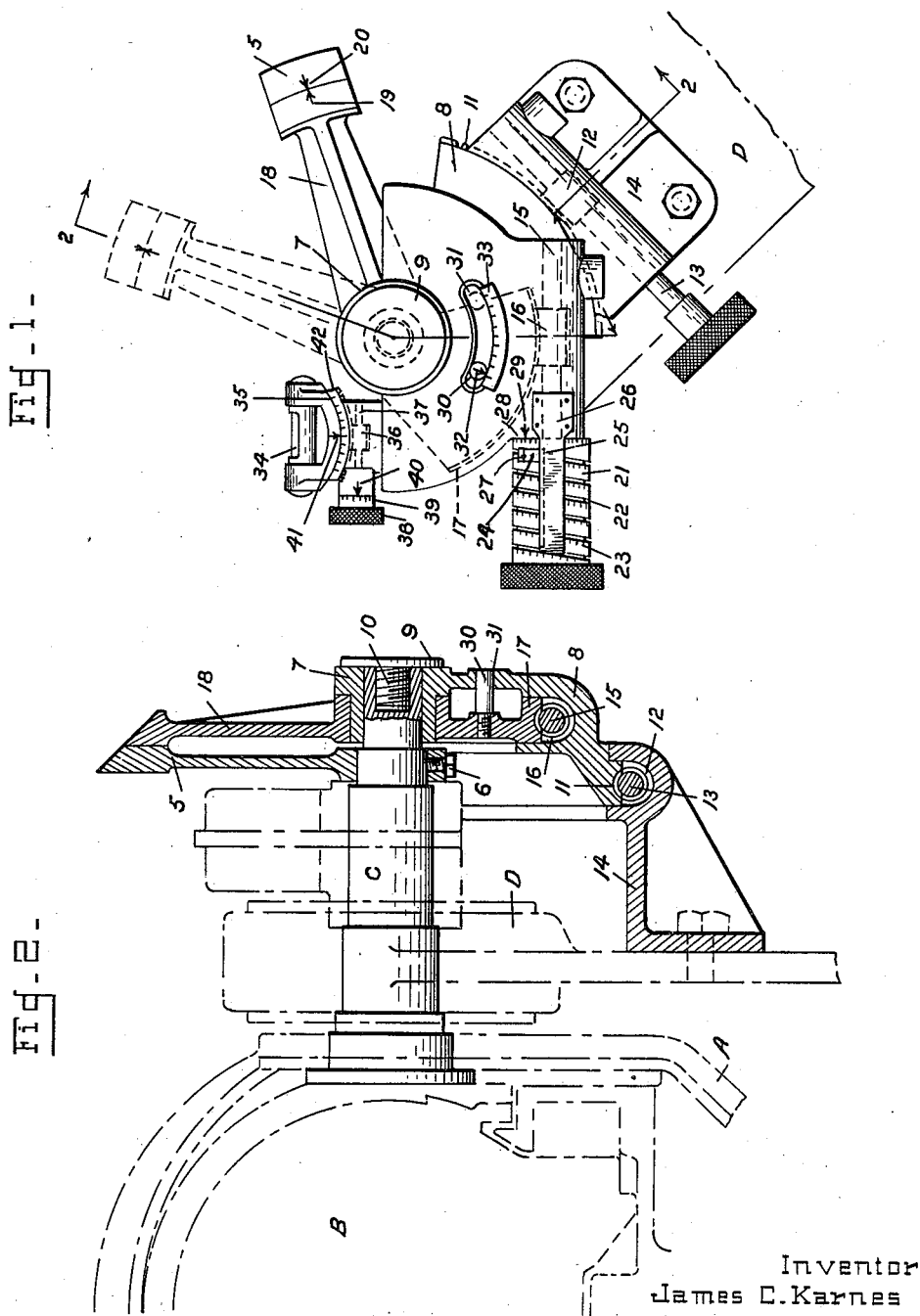
Inventor
James C. Karnes
By W. N. Roach,
Attorney Patented May 10, 1938

2,116,519

UNITED STATES PATENT OFFICE 2,116,519

INDEPENDENT ELEVATION INDICATOR FOR GUNS

James C. Karnes, Buffalo, N. Y.

Application March 20, 1935, Serial No. 12,035

1 Claim. (Cl. 33—48)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an independent elevation indicator for guns.

The purpose of the invention is to provide a simple and compact elevation indicator in which a pointer movable in elevation with the gun is matched with a pointer that is separately displaceable according to angle of position of the carriage, angle of site and range or elevation.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in side elevation of the improved sighting system with the parts in full lines at zero adjustment and zero elevation.

Fig. 2 is a transverse sectional view taken generally on the line 2—2 of Fig. 1, with the parts at maximum elevation.

Referring to the drawing by characters of reference, there is shown a cradle A, carrying a reciprocable gun barrel B, and having trunnions C mounted in the side plates D of a gun carriage.

A pointer 5, movable with the gun in elevation is carried on a support, preferably the right trunnion, to which it is fixed by means of a screw 6.

The trunnion projects beyond the pointer 5 to form a support for the hub 7 of a rocker 8 which is retained in place by the enlarged head 9 of a screw 10. The lower end of the rocker 8 is formed with a segmental gear 11 which meshes with a worm 12 on a shaft 13 that is mounted in a bracket 14 fixed to the side plate D.

A shaft 15 journaled in the rocker has a worm 16 which meshes with a segmental gear 17. The gear 17 is journaled on the hub of the rocker and includes a pointer 18 having an index 19 adapted to register with an index 20 on the pointer 5. The shaft 15 carries a drum 21 whose surface is formed with a helical groove 22 and is inscribed with a range scale 23 in terms of linear measurement, such as yards. A finger 24 having a lug 25 riding in the groove 22 is slidably carried by a bar 26 fixed to the rocker and has an index 27 readable against the range scale 23.

The forward end of the drum is inscribed with a scale 28 in terms of angular measurement, such as mils, and marked from 0 to 99 for one complete revolution of the drum. This scale is read by means of an index 29 on the rocker. The gear 17 carries a pin 30 which rides in a slot 31 in the rocker and has an index 32 readable against a scale 33 marked in hundreds of mils. The final reading indicating the angular displacement of the pointer 18 relative to the rocker is taken from the scales 33 and 28.

A spirit level 34 is mounted on the rocker and has a segmental gear 35 meshing with a worm 36 on a shaft 37. A knob 38 on the shaft is provided with a mil scale 39 marked from 0 to 99 and readable against an index 40. An index 41 on the spirit level is readable against a mil scale 42 marked in hundreds of mils.

The parts of the sight are in the position shown in full lines in Fig. 1 when all scales are at zero and the gun and carriage are level.

If the carriage is out of longitudinal level, this condition, representing the angle of position of the carriage, will be indicated by the spirit level 34. The bubble of the spirit level is centered by acting on the shaft 13 to move the rocker 8—11. Since the rocker is locked to the pointer 18 through the gearing 16—17, the movement of the rocker will effect displacement of the pointer 18.

When the target is above or below the horizontal plane at the muzzle of the gun, the spirit level is displaced by the shaft 37 an amount corresponding to the angle of site. The bubble of the spirit level is then centered by moving the rocker 8 through the gearing 11—13 and the pointer 18 is displaced. If the gun is now elevated until the index 20 on the pointer 5 is brought into registration with the index 19 of the pointer 18, the gun will be in the plane of site, that is the plane containing the gun and target.

In allowing for the trajectory of the projectile the gun must be elevated above the plane of sight. The pointer 18 is displaced an amount in accordance with range or elevation by acting on the shaft 15. The gun is ready to fire when it is elevated an amount which will match its pointer 5 with the pointer 18.

It will therefore be seen that the angle of position of the carriage due to being longitudinally out of level and the angle of site due to difference in elevation of gun and target may be applied separately or concurrently by actuating the shaft 13 and that the quadrant angle due to range may be applied by actuating the shaft 15.

The pointer 18 can therefore be moved into a position indicating the final firing angle independently of the gun. The elevation operator has only to elevate the gun until the pointer 5 matches the pointer 18.

I claim:

A gun carriage, a gun cradle having trunnions in the carriage, a first pointer fixed to one of the trunnions and movable therewith, a rocker having a hub mounted on the trunnion and provided with a slot concentric of the trunnion axis, a scale of angular measurements on the rocker adjacent the slot, a segmental gear rotatably mounted on the hub of the rocker and including a second pointer adapted to be aligned with the first pointer, a pin on the gear riding in the slot of the rocker and bearing an index readable against the scale, a shaft mounted in the rocker and meshing with the gear, a scale in terms of linear measurements and a scale in terms of angular measurements on the shaft, a spirit level on the rocker and mounted to be sensitive to rotations thereof about the trunnion axis, means for angularly displacing the spirit level on the rocker by measurable amounts, and means on the carriage for angularly displacing the rocker about the trunnion axis to center the bubble of the spirit level.

JAMES C. KARNES.